July 7, 1970     W. G. McCLEAN     3,518,889
CARRIAGE MOUNTING CONSTRUCTION FOR A FILAMENT WINDING MACHINE
Filed Jan. 10, 1968     2 Sheets-Sheet 1
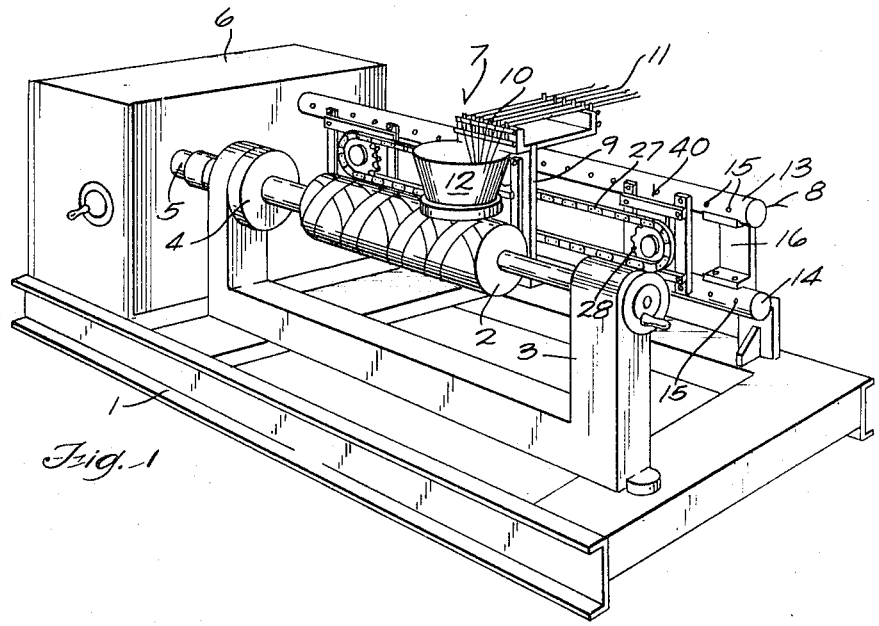
Inventor
William George McClean
By Andrus & Starke
Attorneys

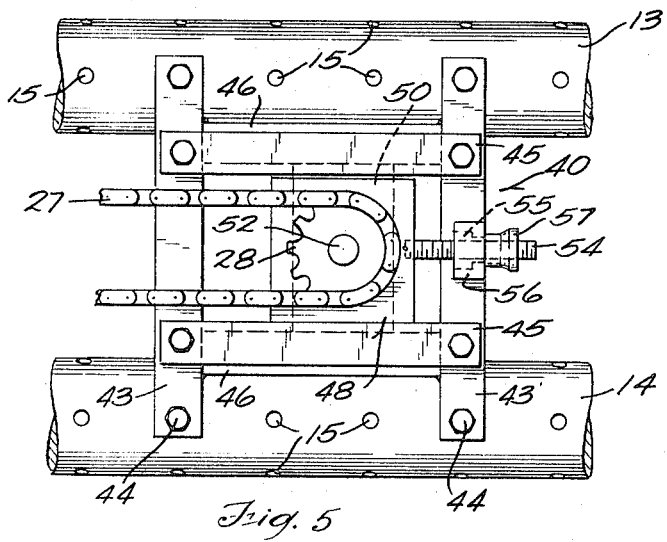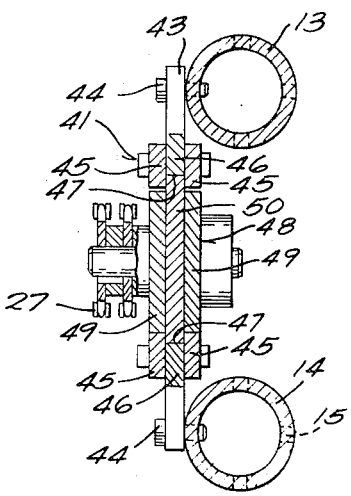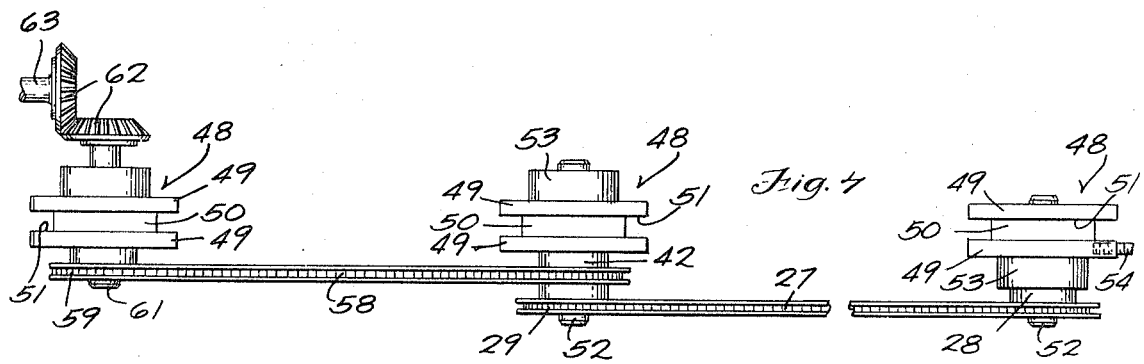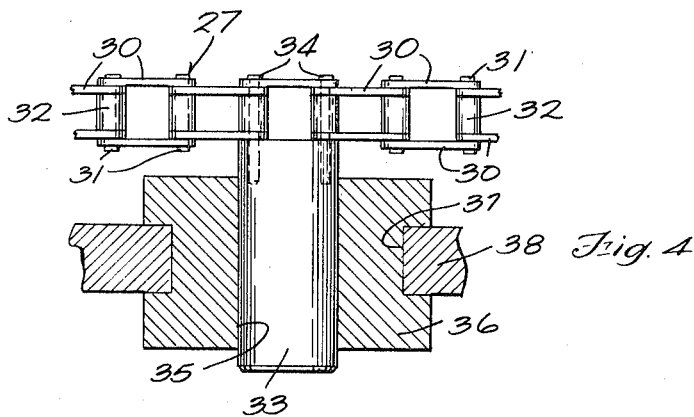

United States Patent Office 3,518,889
Patented July 7, 1970

3,518,889
CARRIAGE MOUNTING CONSTRUCTION FOR A FILAMENT WINDING MACHINE
William G. McClean, Milwaukee, Wis., assignor to McClean-Anderson, Inc., Milwaukee, Wis., a corporation of Wisconsin
Filed Jan. 10, 1968, Ser. No. 696,915
Int. Cl. F16h 7/14
U.S. Cl. 74—37        10 Claims

ABSTRACT OF THE DISCLOSURE

The invention relates to a filament winding machine for winding a fiber reinforced plastic article, and particularly to a construction for supporting and driving the winding head or carriage in reciprocating movement along the length of the rotating mandrel.

---

Fiber reinforced plastic articles are generally fabricated by winding a strand of reinforcing material impregnated with resin on a mandrel in a helical pattern. The strand is guided onto the mandrel by a winding head which reciprocates along the length of the mandrel and lays the strand on the mandrel in a number of superimposed layers.

In the conventional winding machine, the winding head includes a carriage which rides on a generally box-section rail extending generally parallel to the mandrel. The rail must be fabricated to precise tolerances in order to accurately program the winding pattern and it is difficult to fabricate an accurately machined box-section rail, particularly when the rail has a substantial length.

In the conventional filament winding machine, the carriage is driven by a chain drive which is trained over sprockets mounted on the rail. The sprockets must necessarily be spaced outwardly of the guide rail and when using a box-shaped rail, this necessitates providing the rail with an overhang on which the carriage rides so that the required clearance is provided for the sprockets or other drive members.

The present invention is directed to a novel construction for supporting and driving the carriage of a filament winding machine. The structure includes a pair of generally parallel, tubular rails which are supported at their ends by pedestals. Each pedestal includes a pair of cradles which support the respective rails and each cradle encompasses about 90° of the circumference of the rail to which it is attached, thereby leaving the upper portion of the upper rail exposed and the lower portion of the lower rail exposed.

The carriage is mounted for reciprocating movement on the rails by a pair of upper, diagonally disposed rollers which ride on the upper exposed portion of the upper rail and by a pair of lower, diagonally disposed rollers which ride on the exposed lower portion of the lower rail.

The guide rails are provided with a series of spaced openings which extend throughout the length of the rails. Sprocket support members are connected to the openings in the rails and sprockets for the carriage drive chain are adjustably mounted on the supports so that an infinite adjustment of each sprocket can be obtained in a direction longitudinal of the mandrel.

The invention also provides a novel chain connecting construction by which the carriage is connected to the endless drive chain. One of the chain links is replaced by a cylinder which extends laterally outward from the chain, and the pins which connect the chain links extend within openings in the end surface of the cylinder. The cylinder is journalled within an opening in a slide mounted for sliding movement in a slot in the carriage. With this construction, the carriage can follow the chain, as the chain travels around the sprockets at the ends of its path of travel.

The use of a pair of tubular rails substantially reduces the cost of the guide mechanism as compared with a box-section guide rail or beam. The tubular rails can be obtained in longer lengths and can be more readily cylindrically ground or machined than a box-section rail to provide the required tolerance for the rail.

Moreover, as the guide structure includes a pair of spaced rails, the sprockets for the endless drive chain can extend within the space between the rails, thereby eliminating the necessity for an overhang on the guide rail, as is required with a box-section rail.

As the guide rails are provided with a series of holes, the sprocket supporting assemblies can be readily moved along the length of the guide rail, and similarly, the position of the pedestals or rail supports can also be changed as desired.

As a further advantage, an infinite adjustment of the sprockets along the guide rail is provided. The sprocket support assemblies can be positioned at spaced intervals along the length of the rail by connection with the spaced openings in the rail, and in addition, each sprocket can be adjusted with respect to its supporting assembly so that an infinite adjustment of the sprockets along the length of the rail is provided.

Other objects and advantages will appear in the course of the following description.

The drawings illustrate the best mode presently contemplated of carrying out the invention.

In the drawings:

FIG. 1 is a perspective view of a filament winding machine incorporating the invention;

FIG. 2 is a transverse section showing the manner in which the carriage is mounted on the guide rail;

FIG. 3 is a plan view of the carriage and slide;

FIG. 4 is a transverse section taken along line 4—4 of FIG. 3 and showing the connection of the drive chain to the slide of the carriage;

FIG. 5 is an enlarged plan view showing the sprocket support assembly mounted on the guide rails;

FIG. 6 is a vertical section of a sprocket support assembly; and

FIG. 7 is a plan view of the sprockets and drive chain with the guide rails and sprocket support frames being removed from the drawing.

The drawings illustrate a filament winding machine for winding a fiber reinforced, plastic, tubular article. The winding machine includes a base 1 and a mandrel 2 is mounted for rotation above the base. One end of the mandrel is supported for rotation by a tailstock 3, while the other end of the mandrel is connected to a headstock 4. Drive shaft 5 is connected to the headstock and shaft 5 is driven by a drive mechanism located within the housing 6. With this construction, the rotation of the drive shaft 5 serves to rotate the mandrel 2 about its axis.

The fibrous material is guided onto the rotating mandrel 2 in a helical pattern by a winding head, indicated generally by 7, which is supported for movement on a frame 8 mounted on the base 1. The winding head 7 includes a generally channel-shaped carriage 9 and a series of combs 10 are mounted on the carriage and serve to space the fibrous strands 11 apart as they are drawn toward the mandrel. The strands 11 pass through a resin applicator 12 which serves to gather the strands into the form of a band or tape and applies a coating of resin to the band before it is wound in a helical pattern on the mandrel 2.

The frame 8 includes an upper rail 13 and a lower rail 14 which are generally parallel and are formed of tubular stock. Each rail is provided with four rows of equally spaced holes 15, and the rows are spaced approximately 90° apart. Rails 13 and 14 are supported at their ends by pedestals 16 mounted on the base 1. As best shown in FIG. 2, each pedestal 16 is provided with an upper cradle 17 which supports the upper rail 13 and a lower cradle 18 which supports lower rail 14. The upper rail 13 is connected to the cradle 17 by bolts 19 which are threaded in the holes 15 in the rail, while lower rail 14 is similarly connected to cradle 18 by bolts 20.

Cradles 17 and 18 have generally curved supporting surfaces which encompass approximately 90° of the circumference of the rail, thereby leaving the remaining portion of the circumference exposed so that carriage rollers can ride on the rail. As shown in FIG. 2, a pair of upper, diagonally disposed rollers 21 are mounted for rotation on block 22 carried by the upper flange 23 of the carriage 9. Similarly, a pair of lower, diagonally disposed rollers 24 are journalled on a block 25 mounted on the lower flange 26 of the carriage. The rollers 21 straddle a vertical plane passing through the center of rail 13 and ride on the upper surface of the rail, while rollers 24 also straddle the vertical plane and ride on the lower surface of rail 14. The rollers 21 and 24 enable the carriage 9 to ride freely along the guide rails 13 and 14.

The winding head 7 is driven in reciprocating movement along the length of the mandrel by an endless chain 27 which is trained over a pair of sprockets 28 and 29. The chain 27 is a conventional roller chain and includes a series of generally parallel links 30 which are connected by pins 31. Rollers 32 are disposed between the ends of each pair of links.

To connect the chain 27 to the carriage 9 so that the carriage will move in accordance with travel of the endless chain, a cylinder 33 is substituted for one of the links 30 of the chain, and a pair of pins 34, having a substantially greater length than the pins 31, connect the chain links together, as well as being received within holes in the end surface of cylinder 33. As best shown in FIG. 4, cylinder 33 is rotatably received within the central opening 35 in a slide 36 which is mounted for vertical movement in slot 37 defined by the parallel bars 38 which are secured vertically across the central opening 39 in the carriage 9. As the chain moves in its endless travel, the connection of the cylinder 33 to the slide 36 will move the carriage along the mandrel. The rotatable connection of cylinder 33 with slide 36 permits the slide to follow the chain as the chain moves around the sprockets 28 and 29 at the ends of its path of travel. Thus, the cylinder 33 functions in a dual capacity, enabling the slide to follow the chain 27 around the sprockets, and secondly, the end surface of the cylinder acts as a connecting link for the chain itself.

The sprocket 28 is mounted on a sprocket support assembly 40 mounted on rails 13 and 14, while the sprocket 29 is similarly mounted on a sprocket support assembly 41. In addition to sprocket 29, the support assembly 41 also carries a second sprocket 42.

As shown in FIG. 5, each support assembly 40 and 41 includes a pair of spaced vertical bars 43 with the ends of the bars being connected to the rails 13 and 14 by bolts 44 which are threaded into the openings 15 in the rails. In addition to vertical bars 43, each sprocket support assembly is provided with two pairs of horizontal bars 45 and each pair of bars 45 is connected by bolts to opposite sides of the vertical bars 43. In addition, an intermediate bar 46 is mounted between the horizontal bars 45 and the horizontal edge of each bar 46 is spaced from the corresponding edges of the bars 45 to provide upper and lower guide recesses 47. A slide 48 is mounted for horizontal movement within the recesses 47 in each sprocket assembly.

As shown in FIG. 6, each slide includes a pair of outer slide plates 49 which are in vertical alignment with the horizontal bars 45. In addition, each slide includes a central or intermediate plate 50 which extends vertically beyond the plates 49 and the projecting upper and lower ends of plate 50 are received within the recesses 47 to guide the slide in horizontal movement. As shown in FIG. 5, the side edges of the central plate 50 are spaced inwardly from the corresponding side edges of the outer plates 49, to provide a vertically extending recess 51 along the side edges of each slide. The vertical recesses 51 are adapted to receive the vertical bars 43 during sliding movement of the slide 48.

The sprocket 28 of support assembly 40 is mounted on a shaft 52 which is journalled within a bearing block 53 secured to one of the side plates 49 or slide 48. Similarly, the sprocket 29 of sprocket support assembly 41 is mounted on a shaft 52 which is journalled in a block 53 carried by the plate 49 of slide 48. However, due to the fact that the sprocket 42 is also mounted on the shaft 52 of sprocket support assembly 41, the slide 48 is reversed so that the bearing block 53 extends to the rear away from the mandrel, while the bearing block 53 of the sprocket support assembly 40 extends forwardly toward the mandrel, thereby enabling the sprockets 28 and 29 to lie in a common plane. This is best shown in FIG. 7.

The tension on the chain 27 can be adjusted by adjustment of the slide 48 with respect to the sprocket support assembly 40. As shown in FIG. 5, a threaded adjusting screw 54 passes through a hole 55 in a block 56 secured to one of the vertical bars 43 of support assembly 40. One end of the screw 54 is threaded within an opening in one of the side plates 49 of the slide, while the opposite end of the screw receives a nut 57. By releasing the nut and turning the screw, the position of the slide 48, and thereby the tension on the chain 28, can be varied. The slide 48, which carries the sprocket 28, can be locked in position by threading the nut 57 down on the screw 54.

The shaft 52, which carries sprocket 29, is driven by a chain 58 which is engaged with the sprocket 42, as well as with a drive sprocket 59, journalled on a sprocket support assembly 60 similar to support assemblies 40 and 41. Sprocket 59 is mounted on shaft 61 and the opposite end of the shaft is connected through beveled gears 62 to a drive shaft 63 connected to the drive mechanism located within housing 6.

As the rails 13 and 14 are provided with the spaced holes 15, the pedestals 16, as well as the sprocket support assemblies 40, 41 and 60, can be connected anywhere along the length of the rails and can be readily repositioned, depending upon the requirements of the particular winding operation. In addition to the adjustment provided by the holes 15, the slides 48, which carry the sprockets 28 and 29, can be adjusted with respect to the sprocket support assemblies a distance slightly greater than the spacing between the holes 15. This provides an infinite adjustment of the sprockets along the length of the rails 13 and 14.

The cradles carried by the pedestals 16, which support the rails 13 and 14, encompass only approximately 90° of the circumference of the rails, thereby leaving approximately 270° of the circumference free to be engaged by supporting rollers or wheels. While the drawings illustrate the rollers as being applied to the upper quadrant of the upper rail 13 and to the lower quadrant of the lower rail 14, it is contemplated that in some situations the rollers may be applied to other exposed quadrants of the guide rails.

As the guide rails 13 and 14 are spaced apart with a clearance therebetween, the bearing blocks 53 and shafts 52 can extend within this clearance. If a box-section rail was used, it would necessitate an overhang for mounting the sprocket support assemblies as the bearings and shafts project inwardly, as shown in FIG. 7.

Various modes of carrying out the invention are contemplated as being within the scope of the following claims particularly pointing out and distinctly claiming the subject matter which is regarded as the invention.

I claim:

1. In a filament winding machine, a rotatable mandrel, a carriage, winding means mounted on the carriage for winding a strand on the mandrel in a generally helical pattern, a pair of spaced generally horizontal parallel rails, supporting means including a first cradle disposed in engagement with a first of said rails at a location spaced from an end of said first rail and including a second cradle disposed in engagement with the second of said rails at a location spaced from the end of said second rail, said first cradle encompassing only a minor portion of the circumference of said first rail with a major portion of the circumference of said first rail being exposed, said lower cradle encompassing only a minor portion of the circumference of said second rail with a major portion of the circumference of said second rail being exposed, first roller means mounted on the carriage and disposed to ride on the exposed portion of the first rail, second roller means mounted on the carriage and disposed to ride on the exposed portion of said second rail, and means for driving said carriage in a reciprocating path of travel on said rails to thereby wind the strand on the mandrel.

2. The structure of claim 1, wherein said rails are vertically spaced and said first rail is an upper rail and said second rail is a lower rail, and wherein the exposed portion of said upper rail includes the upper surface of the upper rail and the exposed portion of said lower rail includes the lower surface of the lower rail.

3. The structure of claim 1 wherein said first roller means comprises a pair of rollers disposed diagonally with respect to a vertical plane extending along the axis of the first rail, and said second roller means comprises a pair of rollers disposed diagonally with respect to said vertical plane.

4. The structure of claim 3, wherein said first rollers are spaced on either side of said vertical plane and are engaged with the upper surface of the first rail, and said second rollers are spaced on either side of said vertical plane and are disposed in engagement with the lower surface of said second rail.

5. The structure of claim 4, wherein said cradles each encompass approximately 90° of the circumference of the respective rail.

6. The machine of claim 1, wherein each rail is provided with a row of spaced holes extending throughout a substantial length of said rail and each cradle is provided with an opening aligned with the row of holes in the corresponding rail, and connecting means disposed within said opening and a hole of the respective row for connecting said cradle to the rail.

7. The machine of claim 6, wherein each rail is provided with a second row of spaced holes and each cradle is provided with a second opening aligned with the second row of holes in the corresponding rail, and second connecting means disposed within said second opening and a hole of the respective second row for connecting said cradle to the rail.

8. In a filament winding machine, a pair of spaced generally parallel guide rails, a carriage mounted for reciprocating movement on said guide rails, each of said guide rails having a series of openings located at spaced intervals along a substantial length of the guide rail, sprocket support means connected to the guide rails through said openings, said sprocket support means including a frame, connecting means for connecting the frame to the openings in said guide rails, a slide mounted for sliding movement on the frame in a direction parallel to said guide rails, a sprocket journalled to said slide, an endless chain connected to the sprocket, means for connecting the chain to the carriage to thereby move the carriage along the guide rails, and adjusting means for moving the slide on said frame.

9. The structure of claim 8, and including locking means for locking the slide to the frame.

10. The structure of claim 8, wherein the frame includes a pair of spaced vertical supports which extend between the spaced guide rails.

References Cited

UNITED STATES PATENTS 2,564,816   8/1951   Rehwald _____ 74—37

FOREIGN PATENTS 584,500   10/1958   Italy.

MILTON KAUFMAN, Primary Examiner

W. S. RATLIFF, Jr., Assistant Examiner

U.S. Cl. X.R.

242—158